US005736990A

United States Patent [19]
Barrus et al.

[11] Patent Number: 5,736,990
[45] Date of Patent: Apr. 7, 1998

[54] SYSTEM FOR DESIGNING A VIRTUAL ENVIRONMENT UTILIZING LOCALES

[75] Inventors: John W. Barrus, Lexington; Richard C. Waters, Concord, both of Mass.

[73] Assignee: Mitsubishi Electric Information Technology Center America, Inc., Cambridge, Mass.

[21] Appl. No.: 520,099

[22] Filed: Aug. 28, 1995

[51] Int. Cl.$^6$ .................................................. G06T 1/00
[52] U.S. Cl. .......................... 345/433; 395/138; 395/329
[58] Field of Search ................................ 395/138, 133, 395/127

[56] References Cited

U.S. PATENT DOCUMENTS

| | | | |
|---|---|---|---|
| 3,659,085 | 4/1972 | Potter et al. | 364/449.1 |
| 4,600,919 | 7/1986 | Stern | 395/120 |
| 4,970,666 | 11/1990 | Welsh et al. | 395/123 |
| 5,107,443 | 4/1992 | Smith et al. | 395/331 |
| 5,363,483 | 11/1994 | Jones et al. | 395/133 |
| 5,497,452 | 3/1996 | Shimizu et al. | 395/120 |
| 5,581,765 | 12/1996 | Munroe et al. | 395/677 |

OTHER PUBLICATIONS

Foley et al., Computer Graphics, Addison-Wesley Publishing Company, pp. 222-227, 304-308, 1990.

Primary Examiner—Joseph H. Feild
Assistant Examiner—Jae-Hee Choi
Attorney, Agent, or Firm—Robert K. Tendler

[57] ABSTRACT

A system for virtual environments in which graphical objects are depicted in a space to achieve the required high accuracy regardless of location through establishing locales or subdivisions of the global coordinate system and establishing an origin for each locale, such that the specification of position and movement of a graphical object in the locale can be made with greater precision than using a global coordinate system, thus eliminating the need for high-precision floating point processors or emulation. The system permits designers of virtual environments to work independently on their locales, with overlap being controlled through specifying distance between locale origins as well as relative orientation between the locales. The system also permits ignoring information from non-relevant distant locales to, minimize processing and network bandwidth requirements.

14 Claims, 7 Drawing Sheets

ACCURACY 0.05"
ORIGIN WITHIN 1 MILE

SEATTLE
5 FRAMES/SEC.
NO MOTION FOR 200 MS

WASHINGTON
1000 FRAMES/SEC.
NO MOTION FOR 1 MS

SYSTEM FOR DESIGNING A VIRTUAL ENVIRONMENT UTILIZING LOCALES

FIELD OF INVENTION

This invention relates to placement of graphical objects in a virtual environment scene and more particularly to a system for creating a virtual environment scene using locales, each with its own origin for establishing graphical object location within the locale and for reducing computation load and network bandwidth requirements for networked virtual environments.

BACKGROUND OF THE INVENTION

During the creation of a virtual or simulated environment, the position and orientation of each object must be specified. For a small room, the position of each object can be specified accurately. However, due to precision limits inherent in standard floating point representations such as that described in the IEEE 754 specification, the precision with which one can place an object 3000 miles away is on the order of 1.25 feet (15 inches). What this means is that two vases of flowers which should be next to each other on a table must be some multiple of 15 inches apart, 0 in, 15 in, 30 in, etc., when using a global coordinate system having an origin 3000 miles from the table.

By way of background, in order to build a virtual environment, positions of objects are represented by numbers. Most computers store such numbers in 32 bit segments or chunks in memory. Thus, the precision by which positions in the virtual environment can be specified is limited by the number of bits which are storable in a segment or chunk. The number of bits determines the number of grid lines on which points in the virtual environment can be located. For a fixed format with a uniform grid spacing, the size of the environment determines how many grid lines per lineal inch are available. For large virtual. environments, for instance the size of the Solar System, the spacing between the grid lines is about one mile. Since an object to be represented in the virtual environment must lie on a grid line, this limited precision is insufficient for docking maneuvers.

The above describes an integer system. There are, of course, many possible formats for representing numbers, two of which are the most popular, integer and floating point. As will be appreciated, integers have fixed precision. Integer representation results in a system in which the grid of allowable positions has a uniform spacing, where a grid line represents the location of numbers that can be represented exactly. Fractions lie in between the integer grid and cannot be represented using integers.

The problem with integer systems is that they cannot be extended to larger scale environments. Typically if one chooses the grid spacing for an integer system to represent one tenth of an inch, then the maximum distance from side to side of the virtual environment supporting this precision is about 7,000 miles. This is obviously insufficient to support a docking maneuver in space. The problem for integer systems is that one must determine in advance how large of an environment will be supported and the precision of the position representation is then limited based on the environment's maximum size.

Floating point formats were created to increase the range of representable numbers. However, this is done at the expense of precision at the extremes of the representation. While floating point systems were intended to increase the size of the virtual environment, this is illusory because inaccuracies increase as one moves away from the origin.

More specifically, a floating point value usually has only 6 or 7 decimal digits of precision but can represent numbers up to $10^{38}$ and as small as $10^{-38}$, a much greater range than integer values. The result is, while numbers close to, zero have a smaller grid size, numbers close to the maximum value have ever expanding grid sizes, thus limiting precision at large distances. Although floating point systems are useful, it is this discrepancy of expanding grid size as one moves far from the origin that causes problems for large virtual environments.

By way of example, using floating point representation, grid lines 3000 miles from the origin of a virtual environment would represent 15 inch separations vs. 0.01 inch separations one mile from the origin. As a result, with floating point, spatial aliasing exists in the placement of objects far from the origin of the virtual environment since objects cannot be positioned between grid lines. Spatial aliasing occurs when an object that is supposed to be at one location cannot be put there because the result would be between grid lines. When this occurs, floating point systems move the object to the nearest grid line.

For a 32 bit floating point system one inch from the origin, one can specify a position within 0.12 microinches or $1.2 \times 10^{-7}$ inches of accuracy. At a mile away, the precision is limited to, about 1/100th of an inch. At 3000 miles away the precision is about 15 inches.

For large scale virtual environments, motion calculations suffer even more from the lack of precision. An object 100 miles distant from the origin moving 1 inch per second can have its position updated at most twice per second and will appear to jerk along instead of moving smoothly. This effect is called temporal aliasing. There is also a possibility that the object will move at all because of truncation of the floating point data during the position updates. This occurs when a proposed movement is less than ½ the distance to the next grid line. At 3000 miles from the origin of the virtual environment, any requested motion less than 7½ inches will be lost and the object will appear to remain stationary. This gives rise to no motion when motion is clearly requested.

These two problems of spatial and temporal aliasing can be solved at some expense by employing a higher precision floating point representation like a 64 bit floating point system. However, the costs include significantly increased computational time, more expensive floating point hardware, a large increase in network communication for networked virtual environments and a not insignificant increase in local memory storage for each object. Although a 64 bit floating point system increases the precision of the calculations and extends the range of the global coordinate system, the range is still limited.

Also, a higher precision representation does not eliminate two serious problems for large-scale virtual environments. These have to do with the design of the large scale virtual environment by multiple designers. As used herein "large-scale" is taken to mean that objects exist in the environment that are far apart compared to their sizes, e.g. molecules on a desktop, vehicles on the earth, or planets in the solar system.

One unsolved problem is the parceling of the virtual environment for each person who wants to design a part of that space. Even if all virtual environment authors were able to agree on a single global coordinate system in which to construct their virtual environments, there would inevitably be a large degree of difficulty in deciding who gets the prime virtual real-estate, e.g. closest to the global coordinate origin and who has to share boundaries with whom.

Additionally, in large-scale, interactive environments, computational requirements often increase needlessly with each moving object added to the environment, particularly when those objects are out of view because of their distance. Increasing the floating point precision does nothing to alleviate increasing computational loads.

More generally, when creating a virtual environment, one might build a terrain and put buildings and vehicles on that terrain. People or other models might exist on that terrain also. When an object, like a person, is close to what is called the "origin" of the "Global Coordinate System" or "GCS", that person's position can be specified with great accuracy. However due to the limitations of floating point representation, when an object is far from the origin, the difference between the actual and requested position increases. A request that puts the objects location at 123,456,789.9876 meters from the origin in the Z direction would leave the object at exactly 123,456,792.0000 meters because of the loss of precision in converting to floating point. In fact, at that distance from the origin, an object can only be positioned within 8 meters of the requested position.

By way of example, for large, multi-user, networked environments, there might be great distances between two users. Imagine a space flight game where each participant can occupy a space vehicle. The origin of the universe might be at the sun, but the vehicles themselves might be interacting around Pluto, 3.7 billion miles from the Sun. Since the size of the vehicles is small compared to the distance from the origin, jerkiness caused by imprecision of the floating point representation will be readily apparent. Instead of moving in a smooth motion, each ship would jump a minimum of 256 miles at a time.

Also, imagine trying a docking maneuver using this system. In docking, precise position is of paramount importance and it would be impossible to align the ships with millimeter precision at large distances from the origin of the coordinate system.

Another example of the problem is where a relatively small shift is added to the position of an object like a spacecraft. Since the small shifts can be represented by floating point but are insignificant when the object is far from the origin, the object doesn't move. Moreover, no error is reported, and the motion or shift is lost in the imprecision of the calculation.

Another possible solution to the above problems could be to move the coordinate system. Perhaps the coordinate system could be centered around Pluto instead of the Sun. Precise activities like docking could now take place because the origin is closer to the ships. Smaller motion and position values are not lost due to precision errors. Of course, ships on the other side of the solar system would have much worse problems than before. Thus, using a global coordinate system is still ill-advised.

Another potential solution to the above problem would be to create a grid of local coordinate systems. By specifying the grid indices and the position values, one could find one's precise position with respect to the universal coordinate system. This allows any interacting objects in the universe to interact with much greater precision than before at any point in the universe, assuming that the grid was fine enough. However, this solution has two limitations. First, the grid cannot be infinite in size; and second, this solution still requires a selection of a global coordinate system.

One approach taken by others to limit network and computing load is to divide a large virtual environment up into smaller sections. This is described in the conference proceedings of Virtual Reality Annual international Symposium or VRAIS, 1995 held in Research Triangle Park, North Carolina, in an article entitled Exploiting Reality with Multicast Groups: A Network Architecture for Large-Scale Virtual Environments by Macedonia, Zyda, Pratt, Brutzman, and Barham, pp. 2–10. While this approach does limit data flow and computation for the system as a whole using multi-cast addressing and communication, it does not address the issue of position or motion accuracy because the system uses a global coordinate system and a single origin. The result of using a global coordinate system requires the use of 64 bit floating point.

SUMMARY OF THE INVENTION

In the subject invention a system is designed to address the problems inherent in global coordinate systems, including floating point precision problems which cause aliasing and boundary/location problems in the global virtual environment including proximity determination. The system incorporates 8 floating point precision arithmetic and data but does it in such a way that the location and motion errors are small enough to be insignificant. This is accomplished by the use of locales.

A locale is defined as a geometric area in which the distance between discrete representable positions at the limits of that area are small enough to be considered insignificant. For marble-sized objects, the acceptable distance and motion errors might be 1/100 the radius of a marble. This could be achieved by creating a locale that fits inside a cube ½ mile on a side. For galaxy simulations, much higher imprecision might be acceptable—perhaps 1/100 the radius of a planet would be the appropriate metric. The selection of acceptable imprecision depends on the application. Each locale has a shape or boundary, a local coordinate system, and a set of transformations which relate its coordinate system to that of neighboring locales.

In the real world, there is no global or universal coordinate system. The only way to indicate where something is, is to specify its distance from something else. In the subject system each area of the virtual environment has its own local coordinate system and anything in that area of the environment has a position based on that local coordinate system. These areas, or "locales", can exist independently. However, when two locales are joined together, their locations can be specified with respect to each other by the distance between respective origins and take orientations of the locales themselves. This allows many locales to coexist without overlapping but without requiring an agreement on a single global coordinate system.

As a result, the subject system eliminates the temporal and spatial aliasing in the display of graphical objects positioned on a terrain in which the distances from the origin are very large compared to the size of the object. The system also prevents placement errors during motion of a graphical object occasioned by large distances of the object to an origin.

Additionally, the system eliminates the need for higher precision floating point numbers to describe locations in space and motion, and allows gross filtering in which users spaced apart by large distances can specify positions and motions within their locale without referencing all positions and locations of distant locales. For instance, people inside of one building in a virtual environment cannot see or speak to people inside of another building. Since they can't interact, there is no reason or requirement for them to even consider network traffic from the other locale. This automatic filtering reduces network data for every computer and user automatically. The result is that in a virtual environment which uses multi-cast network packets for updating positions of objects, the filtering load is moved from the CPU to specialized network hardware, because locales not required to be seen are ignored by the network hardware.

Furthermore, the system eliminates need for a coordinator to control parceling of space in a global coordinate system. There is no directory service nor zoning service required, e.g., no central control.

Moreover, since global coordinate systems require global management for zoning or directory service, no such management systems are required.

Also, when inhabitants in a global coordinate system are a long way from the origin of the global coordinate system, they are treated less well by the choice of floating point representation than those close to the coordinate system. In the subject system, these problems are eliminated.

The subject system also provides an easy way for objects to indicate their proximity to other objects or places, while at the same time eliminating temporal and spatial aliasing which are problems at large distances from the origin.

The subject system also eliminates the requirement of large-scale multi-state simulations that require 64 bits of location precision to reduce position and motion errors which are wasteful of both memory and compute power.

Finally, the subject system significantly reduces motion errors due to precision limitations which would otherwise compound quickly.

BRIEF DESCRIPTION OF THE DRAWINGS

These and other features of the Subject Invention will be better understood taken in conjunction with the Detailed Description in conjunction with the Drawings of which.

DETAILED DESCRIPTION

In the design of virtual environments, especially those of large scale or extent, there are three problems facing a designer. The first is the problem of positional and velocity errors when building models and placing objects at large distances from the origin of a coordinate system, referred to herein as the global coordinate system. The result of attempting to place graphical objects at large distances from this origin is that the positional error increases dramatically as one moves from this origin. Likewise, velocity errors occur in the form of jitter in which objects moving at some large distance from the origin appear to jump as if having been filmed at 10 frames per second or less as opposed to 24 to 30 frames per second associated with film and full-frame video.

The second problem facing design of large-scale virtual environments occurs when multiple individuals independently develop models which are to exist in various regions of the virtual environment, with the models to be brought together to create a global environment in which the models and their associated objects interact in a seamless fashion to construct the completed composite model.

The problems faced by such independently operating individuals are, first, to designate which regions of the global coordinate system each individual is responsible for so that the individual can create his model without regard to other models, thereby to eliminate the possibility of unwanted superpositionings.

Secondly, when these regions overlap, there is a further problem of coordinating or arbitrating the ownership or control of the regions. For instance, with models in neighboring regions which overlap, there is a requirement for a simplified system to resolve the conflict.

A third problem exists in large scale virtual environments when many moving objects are placed in the environment. An individual computer and network can be overwhelmed by information, about the changes in each object's position, regardless of how close or far that object is from the scene currently in the view. It is necessary to find some way of eliminating the network and computational load required by objects which have very little or no effect on the final rendered scene on a particular machine.

The above problems are solved in the Subject Invention by creating locales which are self-contained subdivisions of a part of a virtual environment, each with its own model and each with it's own boundary and it's own origin. This permits graphical objects within a locale to be accurately located with respect to this local origin and also permits management of neighboring models merely through specification of an agreed upon distance between the respective locale origins and locale orientations.

Figure 1A:
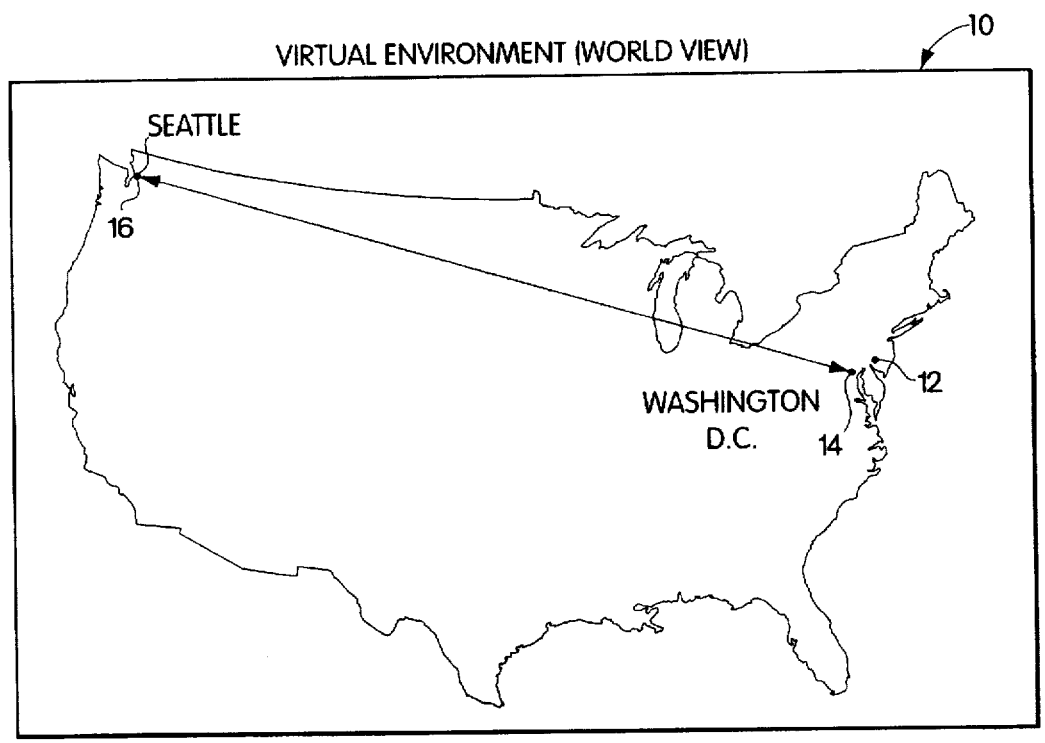
FIG. 1A is a diagrammatic representation of a virtual environment encompassing the entire United States to provide a world view in which communication is established between points that are 3000 miles away from each other, with the origin at adjacent to one of the points.

Referring now to FIG. 1A, a virtual environment is depicted on a computer screen 10 which shows, in this case, an extensive area or region approximately the size of the United States that corresponds to a world view in which graphical objects must be represented. For purposes of illustration, the origin 12 of the coordinate system for this virtual environment is located close to Washington, D.C., here illustrated at point 14. It will be appreciated that should one wish to locate graphical objects at some location in Seattle, here illustrated by point 16, the highest definition grid, some 3000 miles from origin 12, would involve grid lines separated by about 15 inches.

Figure 1B:
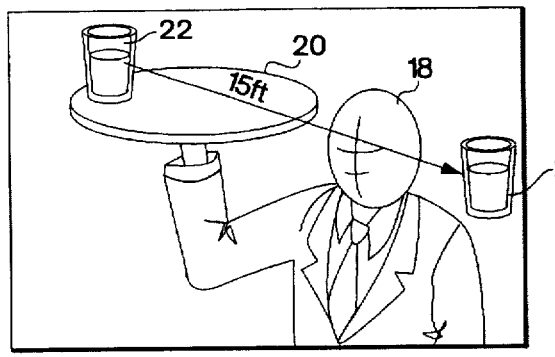
FIG. 1B is a diagrammatic representation of a virtual scene of a waiter with a tray positioned 3000 miles away from the origin indicating a positional inaccuracy of 15 inches for a glass positioned on the tray.
Figure 1C:
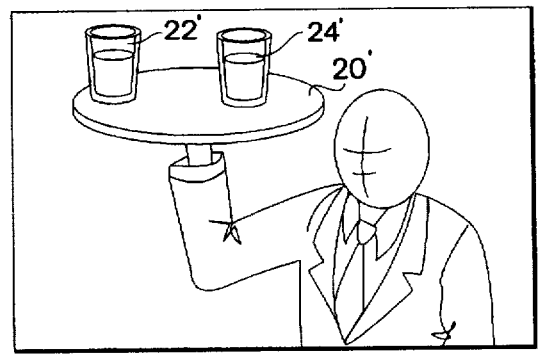
FIG. 1C is a diagrammatic representation of the waiter of FIG. 1B, with the waiter being within one mile of the origin, clearly showing glasses positioned on a tray to within an accuracy of 0.01 inches.

Referring to FIG. 1B, aside from the difficulty of generating a visual image of a waiter 18 holding a tray 20 with a glass 22 thereon, it would be impossible to provide an image of a second glass 24 adjacent glass 22 due to the inability to locate any graphical object at a position intermediate the grid lines. This is because positional accuracy at large distances from the origin of a virtual environment degrades due to limitations in floating point representation. For instance, utilizing a typical 32-bit floating point representation, precision is limited to about 7 digits. This means that graphical objects within one mile of the origin of the virtual environment, such as illustrated in FIG. 1C can be placed to an accuracy of 0.01 inches. This in turn means that glass 24' can be located on tray 20' at a reasonably close position to that desired. However in Seattle the 32-bit floating point system can only deliver accuracy of the aforementioned 15 inches. Thus positional inaccuracies due to floating point representations are a major source of problems when attempting to generate large area virtual environments. This is especially true when trying to represent objects in space over a region that is as many as 6 or 7 orders of magnitude greater than the size of the objects in the region.

Figure 2A:
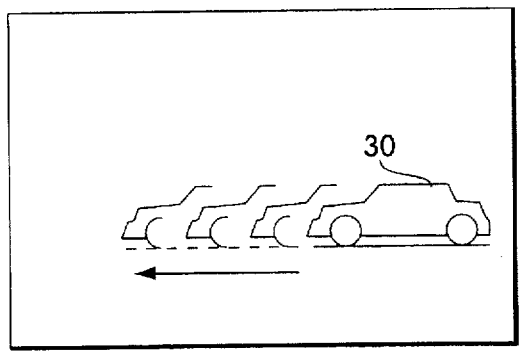
FIG. 2A is a diagrammatic representation of the effect of large distances from the origin of the world view of FIG. 1A in which motion of an object at 3000 miles from an origin results in a jerky representation of motion equivalent to a frame rate of 6 frames per second.
Figure 2B:
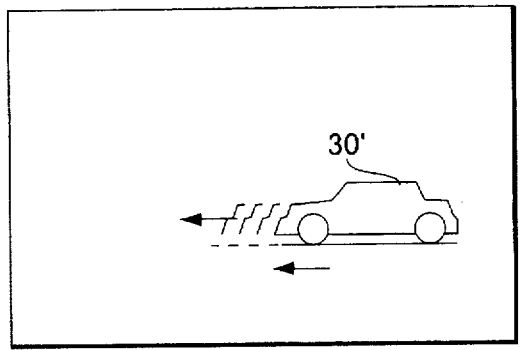
FIG. 2B is a diagrammatic representation of the moving object of FIG. 2A at less than one mile from the origin, indicating smooth movement of the object corresponding to a frame rate of 2,900 frames per second.

Moreover, as can be seen in FIGS. 2A and 2B, for a moving object 30, in Seattle, vs. the same moving object 30' Washington, D.C., a vehicle moving at 5 mph can only be represented at an effective 6 frame per second rate resulting in jittery or jerky motion. This is because no change in position can be registered for 175 milliseconds, given the above example. On the other hand, a vehicle within five miles of the origin at Washington D.C., can have it's image updated at 2,900 frames per second, with a change in position every 0.3 milliseconds.

While it is possible to improve positional accuracy through increasing the number of bits utilized to represent position, in order to accommodate such large scale virtual embodiments, one would have to utilize 64- or 128-bit floating point representations. This increases floating point hardware dramatically because of increased microchip die size and complexity. Alternatively, 64-bit emulation can be used with 32-bit hardware, although there is a substantial slowdown in calculation speed.

Figure 3:
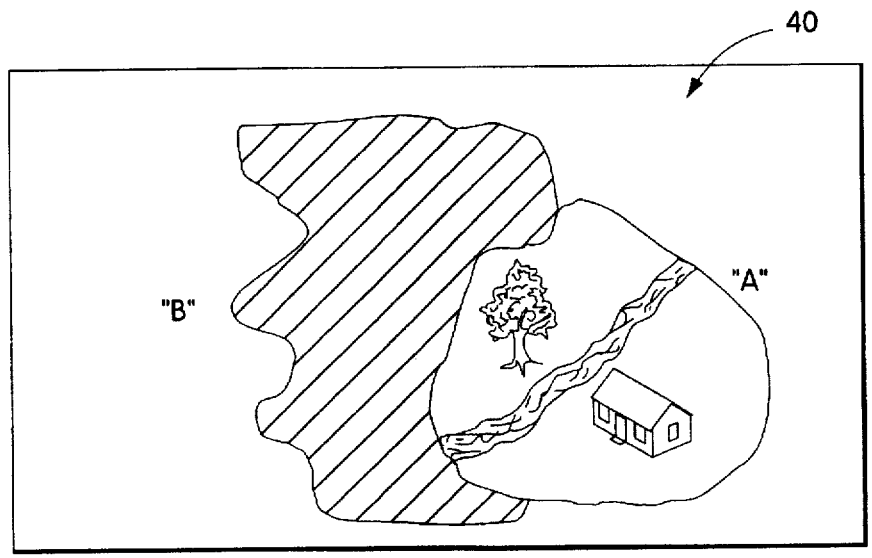
FIG. 3 is a diagrammatic representation of two independently developed virtual environments which when brought together overlap causing a conflict between the models which represent the virtual environments, such that users cannot interact with each model independently because they seek to occupy the same region in virtual space.
Figure 3:
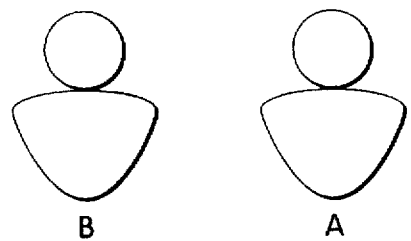

Positional and velocity problems aside, when it is desirable for a number of persons to design a virtual environment several problems occur. As can be seen from FIG. 3, a virtual environment 40 has regions in it, namely region A and region B, the design of which are variously under the control of individual. A and individual B. When these two regions are created separately and then brought together, overlap is likely to occur, such that objects are obscured, intersected by or contained within other objects.

Figure 4:
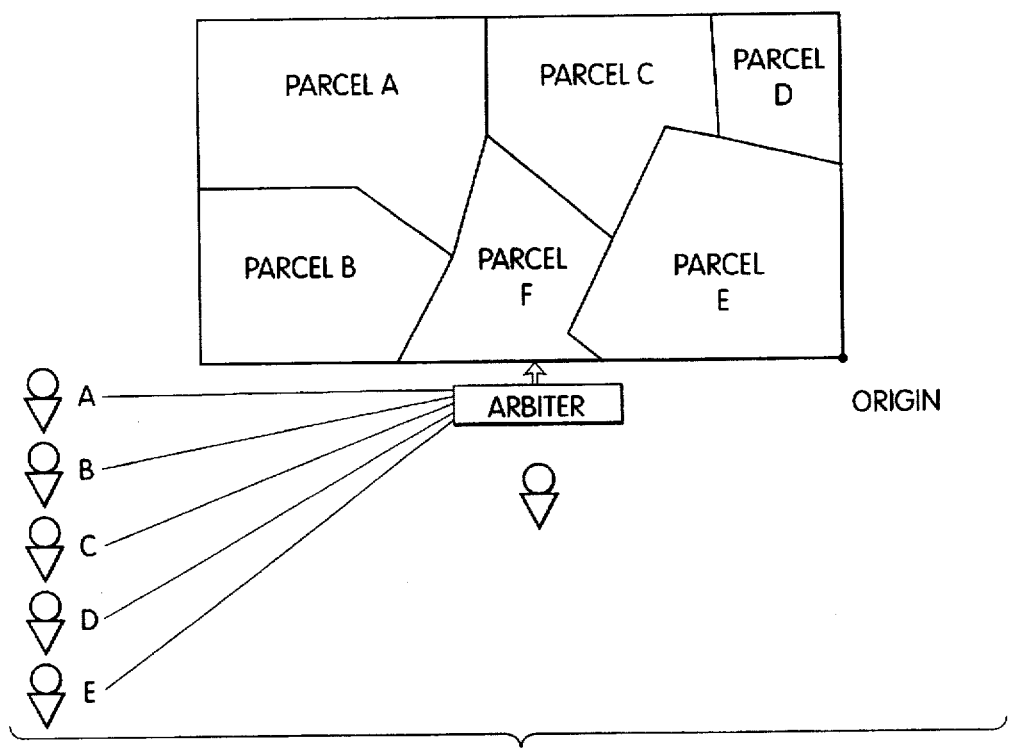
FIG. 4 is a diagrammatic illustration of a possible solution for conflict resolution in the ownership of regions in which an arbiter selects which of the users is to control presentation of models in a given region.

Referring to FIG. 4, one possible solution to the problem of multi-user design of virtual environments includes the utilization of an arbiter 42 into which requests from individuals A-F are routed. Arbiter 42 decides which of the requests will be honored based on overlaps and other criteria. Although this provides a solution to the overlap problem, it does nothing to address the fact that Region A, which is farther from the origin 44 than Region E, is treated less well, which is to say that the accuracy of position and velocity information in Region A is less than that in Region E. It would therefore be difficult for arbiter 42 to fairly and equally accommodate all of the multiple designers of the virtual environment.

Figure 5:
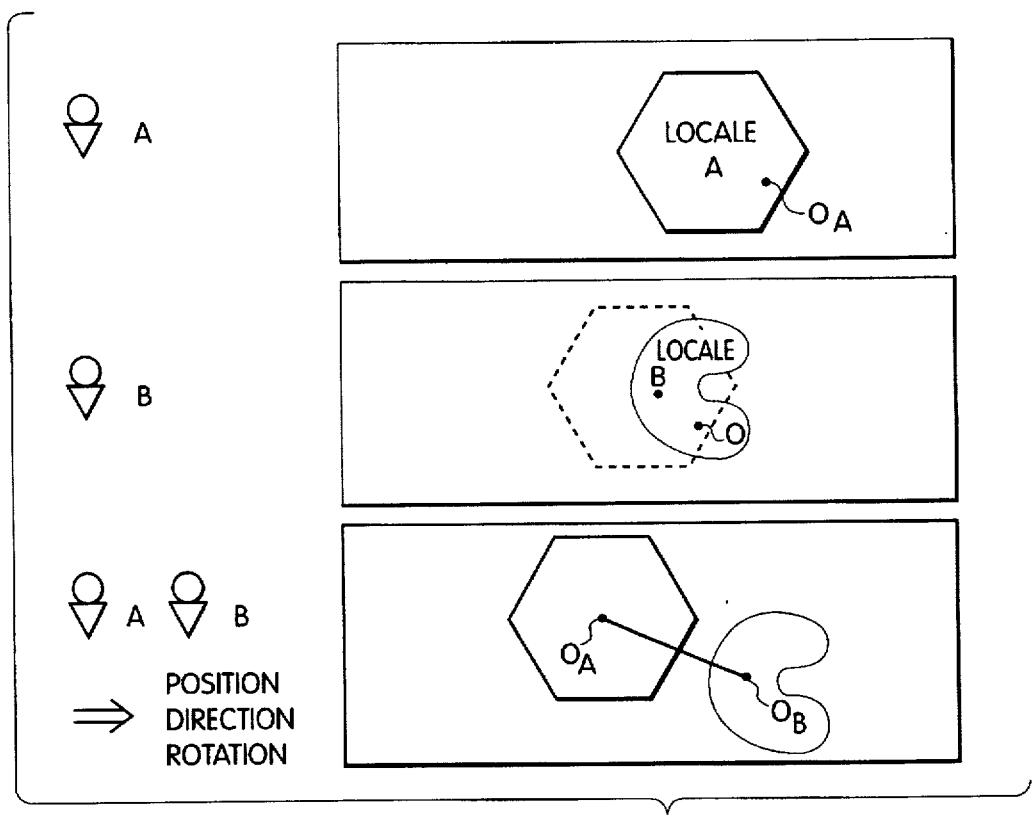
FIG. 5 is a diagrammatic illustration of the subject invention in which the scene or world view is divided into a number of locales, each having its own origin and its perimeter, with each locale being under the control of the creator of the locale, such that positional errors induced at large distances from a global coordinate origin are eliminated and such that the creators of the locales can decide amongst themselves the relationship between neighboring locales, while at the same time operating independently for the design of their locale.

Referring now to FIG. 5, both positional/velocity problems and the ability of multiple designers to create a virtual environment are addressed by the utilization of locales to designate a region both by boundary 46 and by origin 48. As can be seen, user A can create Locale A independent of any other user and in so doing specify its boundary and its unique origin within the boundary. It will be appreciated that this system of dividing up a virtual environment into locales gives the designers great flexibility to work independently on each locale without consideration of actions taken by the other designers. The ability to independently develop a locale is of course dependent upon the final stitching together of the locales to create the world view or completed virtual environment. This means that while Locale A and a Locale B here illustrated by boundary 50 and origin 52 can be generated separately by separate designers, when combined together as illustrated at 54 it will be apparent that Locale B overlies a portion of Locale A. However, by virtue of each locale having its own origin and its own defined boundary it is possible to specify a translation and rotation which will eliminate any undesired overlap, while at the same time providing a convenient and positionally accurate means for completing the virtual environment.

The positional accuracy is guaranteed by virtue of the fact that all positions of objects within a locale are at relatively short distances to their respective origins. The simplicity for the decision making process when utilizing multiple designers is based on the fact that overlapping or interfering positions can be simply designated and brought to the attention of the individual designers at the time that the combination is attempted for completing the virtual environment.

Figure 6A:
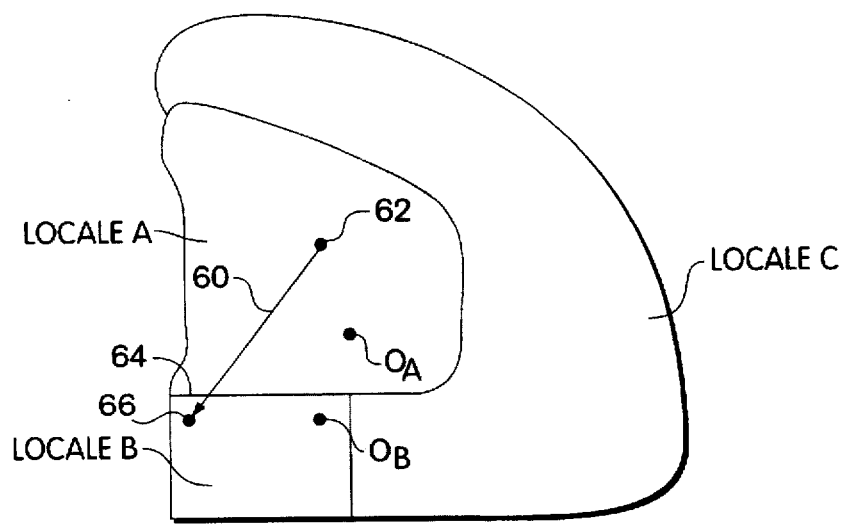
FIG. 6A is a diagrammatic illustration of a move of an object from a position within one locale to a position within a second locale.
Figure 6B:
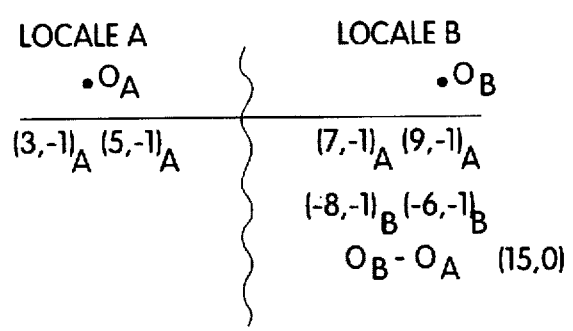
FIG. 6B is a graphical representation of the move from one locale to the other of FIG. 6A, in which the move is specified originally in the coordinate system of the first locale, and then subsequently in the coordinate system of the second locale, thereby to improve positional accuracy of the object in both locales while moving between the locales.

Referring now to FIG. 6A, it can be seen having established. Locale A and Locale B, that since no part of a locale is far from its origin, objects moving within and between locales can have their motions defined with respect to a close origin at all times. Moreover, the specification of the position of an object when crossing the boundary between adjacent locales is easily converted from the coordinate system of one locale to the coordinate system of the adjacent locale through a simple 4×4 matrix multiplication, like those described in basic 3D graphics and robotics texts, for instance Foley and Van Dam's Computer Graphics: Principles and Practice, Addison-Wesley, 1990. As illustrated in FIG. 6B, a situation is depicted in which Locale A and Locale B occupy the same plane and in which Locale B is not rotated with respect to Locale A. In this instance, an object 62 in Locale A is to be moved along vector 60 so that it crosses boundary 64 between Locale A and Locale B so as to reach a position 66 within Locale B. As object 62 crosses the boundary into Locale B, the coordinates of the object are originally specified with respect to the origin of Locale A. These coordinates are transformed by adding the difference between the origins of the two locales. The new coordinates now reflect the coordinates of the object with respect to the origin of Locale B. Thus in the simplest embodiment, a system has been provided in which only the distance and orientation of the coordinate systems of each locale need to be specified. Additionally, through the use of 4×4 transformation matrices, one can also specify additional relationships such as mirror reflection, locale duplication, and scaling or any other transformation which can be achieved with a homogenous 4×4 transformation matrix.

It will be appreciated that while the above mentioned simple system alerts creators of locales as to overlap, it will correctly support locales which overlap, such as a room within a building. It will also be appreciated that transformation can be used to relate a locale to itself as a neighbor and that if locale A is related to locale B by a transformation, that does not imply that locale B is related to locale A by a transformation. For example, one can create a mirror on the wall of a room by relating the room to itself with a transformation specifying reflection.

In sum, the utilization of locales permits both accurate object positioning within a locale and the ability to ensure that any object moving around the virtual environment will be close to an origin.

Figure 7:
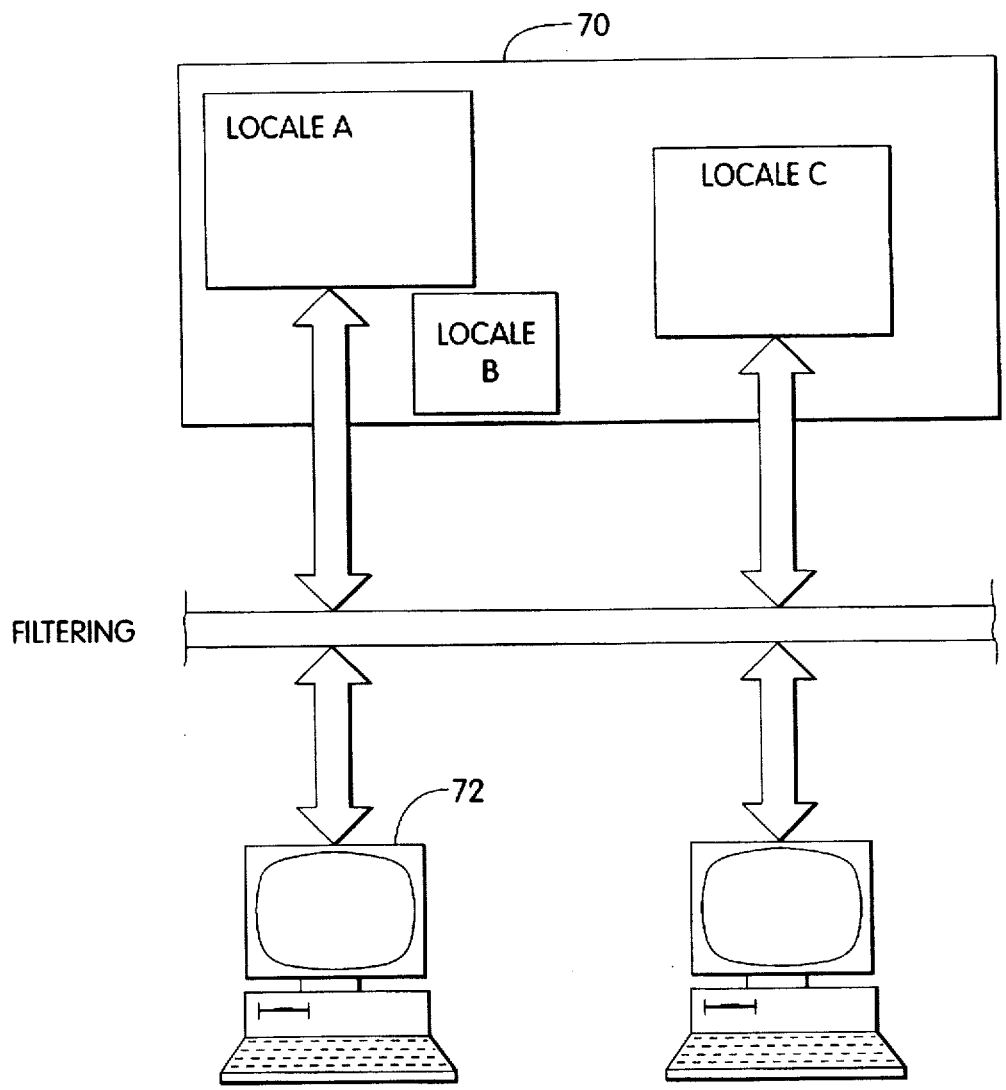
FIG. 7 is a diagrammatic representation of the control of images in various locales illustrating the ability to ignore selected locales not relevant or close to the locales in which activity is to be represented.

Having created a system utilizing locales, it is possible to reduce the amount of computation required by any computer interacting with the virtual environment due the ability to ignore or filter data which does not relate to the locale of interest. For instance, if Locale C is not visible from Locale A, it is possible to ignore data relating to Locale C simply by tagging this data. The data is automatically tagged since all objects must specify their current locale. As can be seen from FIG. 7, Locale C in environment 70 is distant from both Locale A and Locale B, which in this case are adjacent. This means that through a filtering technique utilizing locale tags, computer 72 can be made to display only Locale A and/or any selected neighbors, while ignoring distant locales.

Reducing computational load when creating virtual environments is important because there can be a tremendous amount of data involved in moving many objects around. For instance, most computers can easily handle the computation associated with a simple environment with less than 20 objects in motion. However, for large scale environments there can be in excess of hundreds of objects moving such as in a warfare simulation environment, with each of the objects, such as tanks, being under the control of different individuals. By using locales, the computational load does not increase linearly in proportion to the number of objects because many of the objects will be in locales which are not of interest to any given computer and will therefore be filtered out before computation is performed. The result of the ability to filter out locales is to reduce the hardware requirements such that battlefield simulations can be run on conventional workstations or PC's that can handle 100 million instructions per second, e.g. 100 MIPS.

Figure 8:
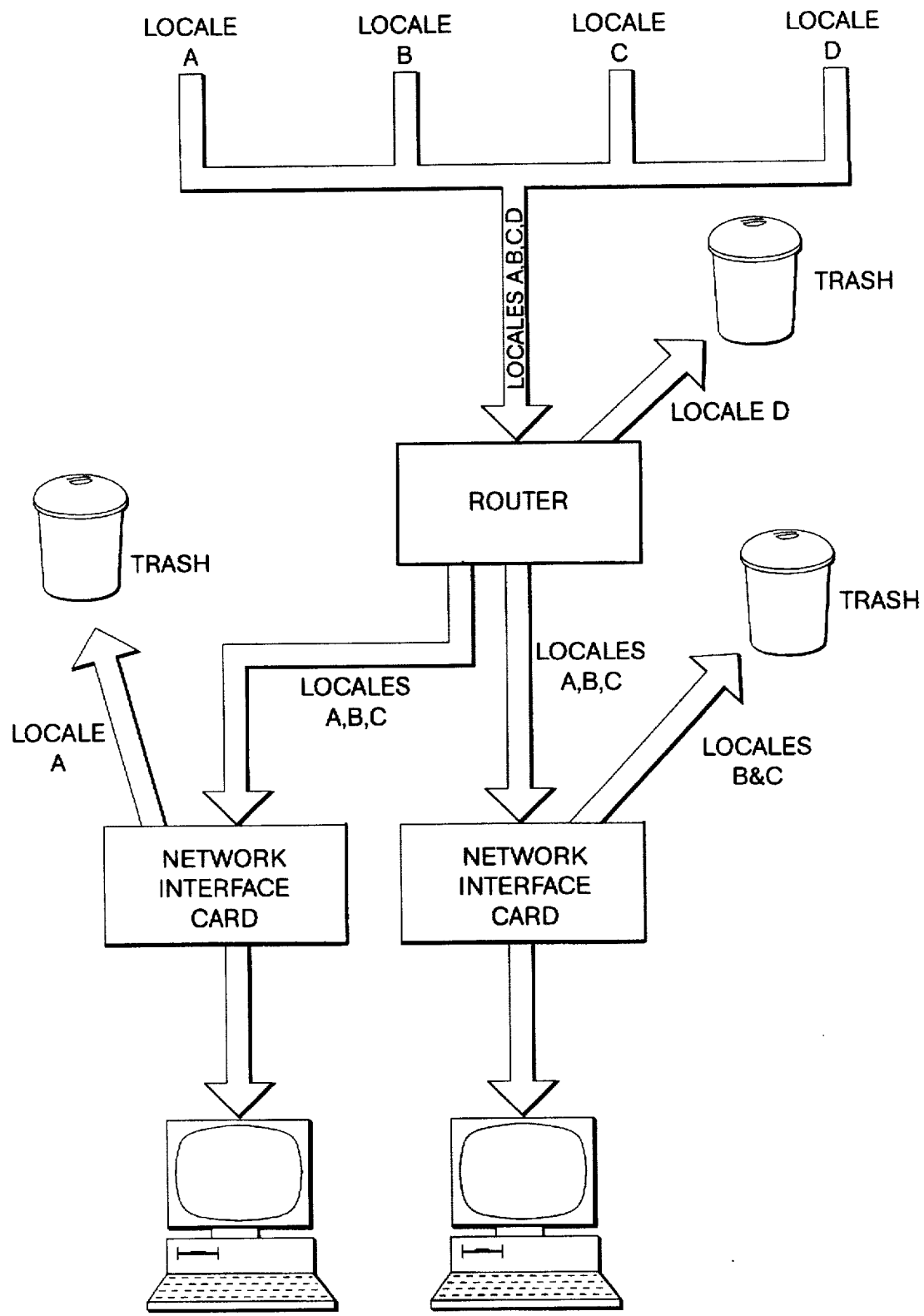
FIG. 8 is a block diagram of a system for limiting the requirement for traffic on a network which relates to locales not sought to be controlled; and, FIG. 9 is a block diagram illustrating a system for creating scenes based on locale models and object animations in which objects are located and moved within or across locales by the specification of both current locale and position, with the discriminator detecting transitions of objects between locales and reporting those transitions to the objects so that they can begin to report their positions with respect to the origin of the newly entered locale.

Referring now to FIG. 8, one way of tagging the data associated with a locale is to broadcast the data on the network to various addresses, one address per locale. This broadcasting is referred to as multi-casting. Network information or data from Locales A-D is supplied over a wide-area network 80 to a router 82 which in this example filters data associated with Locale D by ignoring it as illustrated by sending it to trash can 84. This leaves data from Locales A, B, and C of interest to individuals at terminals 86 and 88. Each of the computers associated with these terminals has an associated network interface card 90 and 92 which receives requests for listening to the appropriate locales and receives data from the router via a local area network 94 comprised of busses 96 and 98 and delivers it to computer memory.

One approach to tagging object motion data associated with a locale is to assign a multi-cast network address to each locale. This can be accomplished when a computer indicates that it wants to incorporate a new locale into a virtual environment. The multi-cast address can be assigned randomly while avoiding addresses currently in use or can be assigned in any other suitable manner. Now, when an objects uses a locale as a motion reference, the computer which is controlling the object broadcasts the object's motion data to the locale's multi-cast address. Any computers on the network listening to that address receive the object's motion data and can update the object locally.

If there are no computers on a particular local area network which are interested in a specific locale, the router which bridges the wide area network and local area network is not required to pass data from that locale through to the local area network. Thus the bandwidth in the local area network need not be adversely affected and need not be designed to accommodate all of the traffic on the wide area network. The locales of interest are specified by computers at terminals 86 and 88 to their respective network interface cards 90 and 92, which in turn indicate their interest in specific multi-cast addresses to router 82.

A specific network interface card and computer may not be interested in some locales which pass the filtering associated with router 82. Further filtering is accomplished by this network interface card by ignoring data associated with locales not selected by the associated computer. As illustrated, the computer associated with terminal 86 has no interest in data associated with Locale A which ignores it as illustrated by sending this data to trash can 100. Likewise, the computer associated with terminal 88, having indicated no interest in data associated with Locales B and C, ignores this data as illustrated by sending this data to trash can 102.

As a result, the locales system permits not only decreased computational load, it also reduces the local area network bandwidth. Additionally, object motion data generated on a given local area network is not transmitted beyond the router 82 unless another computer on the wide area network has indicated an interest in that data. The result is that the bandwidth to which the wide area network is designed can be reduced.

Figure 9:
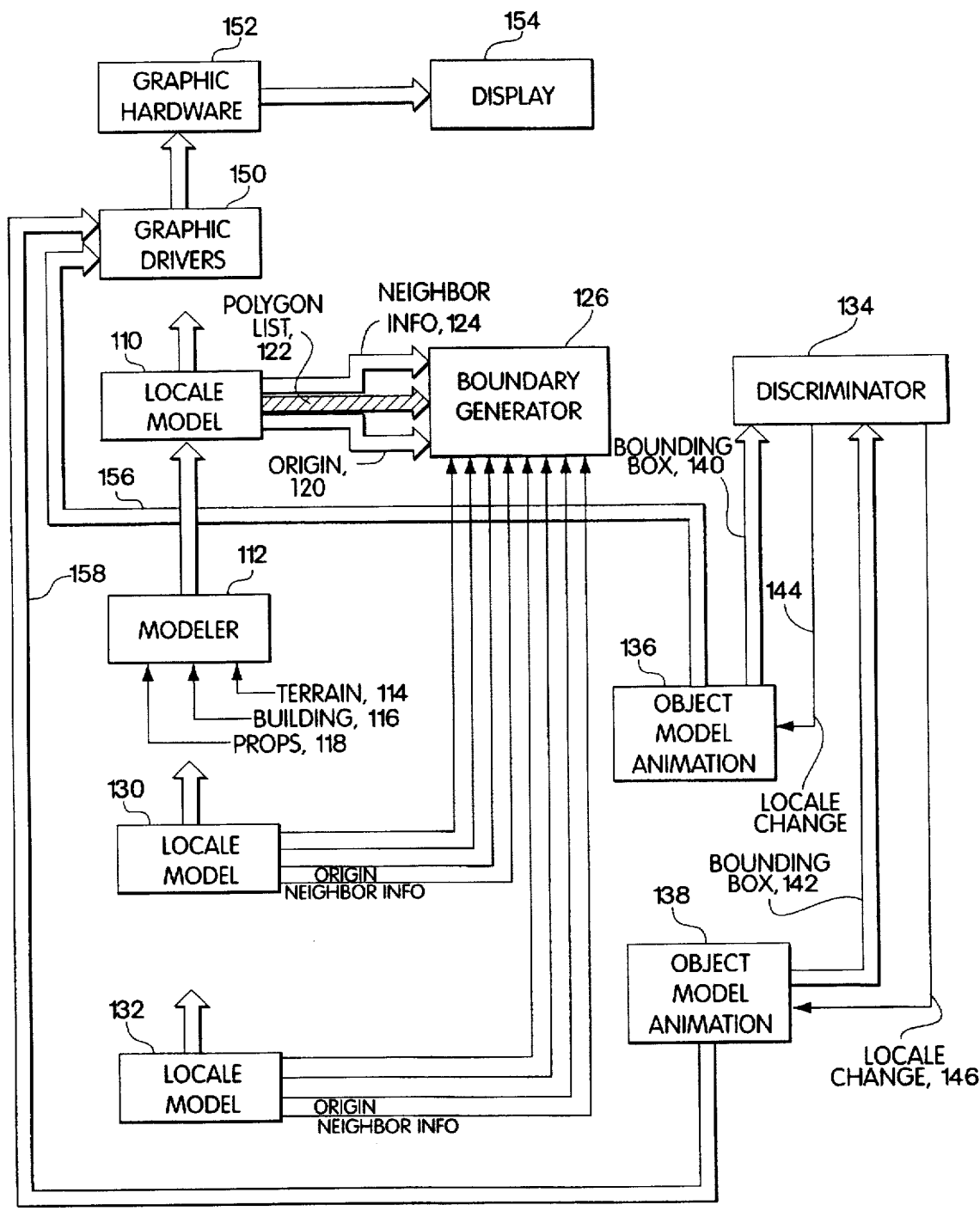

Referring now to FIG. 9, a system for creating locales and managing them is described. In order to provide locales, a locale model 110 is generated with a combination graphical modeler and text editor, which in a typical example has inputs of terrain 114, buildings 116, and props 118 in terms of polygons, colors, textures, and other graphical elements. What is accomplished by the modeler is to generate a backdrop onto which objects are positioned and moved. The model, in one embodiment, consists of a list of polygons with associated colors, textures, and other information pertaining to the display of the polygons and the origin and names of neighboring locales. It will be appreciated that the designer for the locale enters the terrain, buildings, props and other artifacts by specifying the location of the polygons and the other information. One set of programs for creating a locale model is available as Designer's Workbench from Coryphaeus Software of Los Gatos, Calif. and the emacs text editor available with most Unix operating systems. The locale model is stored on a hard disk and specifies the origin of the local, a polygon list, and a list of neighboring locales variously supplied over busses 120, 122, and 124 to a boundary generator 126.

Also coupled to boundary generator 126 are the outputs of a number of different locale models 130 and 132, each specifying a particular locale and what is to be contained therein. Boundary generator 126 takes the incoming information and generates a geometric representation of the boundary of each of the locales, with the output being utilized by a discriminator 134 for determining which locales contain specific objects as they move around in the virtual environment.

Animation programs 136 and 138 provide object model animation which are used to provide the graphical objects and their motions to various locales. The object model animation generates a box which completely encloses the object that is being animated to provide discriminator 134 with an approximate volume for the object. Thus busses 140 and 142 provide the discriminator with both the information necessary to generate the animated object and the location of surrounding volume of the object. Alternatively, any description of the perimeter of the object can be utilized by discriminator 134 to perform its function.

The graphical objects displayed by the object model animations can be created using the same types of modelers as those that can create the graphical description of a locale. Such commercial products include the aforementioned Designer's Workbench and PowerAnimator from Alias Research of Toronto, Ontario, Canada. The bounding boxes are simply generated by obtaining the minimum and maximum x, y, and z values of all of the vertices and polygons describing the graphical model. Such a program is written in C and appears hereinafter.

Discriminator 134 compares the bounding box of each animated object with the boundaries of each locale to determine which locale contains each object. When an object leaves one locale and enters another, the discriminator indicates to the object model animation that the locale has changed so that the animation can proceed in the coordinate system of the new locale. In order to accomplish this, discriminator 134 transmits locale change information over bus 144 or 146 to the appropriate object model animation.

Each locale model outputs its graphical description to graphics driver 150 which takes all of the elements to be drawn on the screen or display and passes the information in the appropriate format to graphics hardware 152 coupled to display 154. Such graphics drivers and graphics hardware are commonplace, with one such graphics driver and hardware package being available from Silicon Graphics Inc., of Mountain View, Calif. as IRIS Performer and Onyx Reality Engine2.

In operation, once the discriminator has provided locale change information to object model animation, each of the object model animation units provides its object model animation to graphics driver 150, here as seen on busses 156 and 158. If boundary generator 126 and discriminator 134 were not used, object model animation would nonetheless be applied to the graphics driver and each object model would remain referenced to a single origin in the locale it was in during startup. This of course would result in the aforementioned positional/velocity inaccuracies.

The system of FIG. 9 thus generates the locale, generates the objects, automatically references an object to the origin of the locale into which it is to move and graphically displays the result. Additionally, each object model animation changes the multi-cast address to which it broadcasts position updates when locale changes have been indicated to it.

In its most simple form, boundary generator 126 is exactly the same as the bounding box generator for the object model animation in that a bounding box boundary would entirely enclose the locale, although not efficiently. In order to indicate that an object is enclosed in a locale, one of the corners of one object bounding box must be enclosed by the locale boundary. This is the most simple form of discriminator 134.

In summary, locales permit accurate placement of objects in a virtual environment. The use of locales also permits designers to work independently on their designated locales and to create a virtual environment through combination. Overlaps and intersections can be controlled through specifying distances between origins as well as orientations of the various locales. The use of locales also permits efficient processing by permitting elimination of data from distant locales relating to object motion data, which in turn minimizes processing and bus requirements. Finally, locales eliminate the requirement for a global reference coordinate system using a single origin which spawns position and motion inaccuracies.

The following is code that implements boundary generation in its simplest embodiment. It creates bounding boxes for two simple polygons which are each defined by three vertices and compares to see if the bounding boxes overlap. This type of code could be used for either terrain overlap checking or checking to see if an object made of polygons is within a terrain's boundary. Almost all terrain and objects used in virtual environments are displayed using a list of colored polygons.

```
#ifndef min
#define min(a,b)      (((a)<(b))?(a):(b))
#endif
#ifndef max
#define max(a,b)      (((a)>(b))?(a):(b))
#endif
#ifndef POINT_ERROR_TOL
#define POINT_ERROR_TOL 0.00001    /* meters – 1/100 of a
                                      millimeter */
#endif
typedef struct Vertex3Tag {
    float x;
    float y;
    float z;
} Vertex3;
typedef enum ( bbNotset = 0, bbSet = 1 } bbStatus;
typedef struct BoundBoxTag {
    Vertex3 min;
    Vertex3 max;
    bbStatus status;
```

-continued

```
}   BoundBox;
static BoundBox bbinit = {
    {0., 0., 0.},
    {0., 0., 0.},
    bbNotSet
};
#define FALSE         0
#define TRUE          !FALSE
#define boundBoxReset(bb)    (*(bb) = bbinit)
/*  Bounding box routines */
/*
    This is a set of routines for creating and setting values of
    bounding boxes.
    boundBoxSetVertex3() sets the value of both the min and max
    position to the position of the vertex v.
    boundBoxGrowVertex3() causes the vertex to grow to include the
    position occupied by vertex v if it is not already contained in
    the bounding box.
    vertexInBoundBox() checks to see if a vertex is enclosed in the
    bounding box.
    boundBoxOverlap() determines whether or not a bounding box
    overlaps another bounding box and can be used to check for
    overlap of locales.
    BoundBoxPrint() prints the values that define the bounding box.
    main() is an example program for comparing to fake "terrains"
    which are simply single polygons with three vertices each and
    indicating whether or not they overlap based on the bounding box
    calculations.
*/
void
boundBoxSetVertex3 (BoundBox   *bb, Vertex3 *v)
{
    bb->min = bb->max = *v;
    bb->status = bbSet;
    return;
}
void
boundBoxGrowVertex3 (BoundBox *bb, Vertex3 *v)
{
    if (bb->status == bbNotSet) {
        bb->min = bb->max = *v;
        bb->status = bbSet;
    }
    else {
        bb->min.x = min(v->x, bb->min.x);
        bb->max.x = max(v->x, bb->max.x);
        bb->min.y = min(v->y, bb->min.y);
        bb->max.y = max(v->y, bb->max.y);
        bb->min.z = min(v->z, bb->min.z);
        bb->max.z = max(v->z, bb->max.z);
    }
    return;
}
int
vertexInBoundBox(Vertex3 *v, BoundBox *bb)
{
    if (bb->status == bbNotset)
        return(FALSE);
    if  ((v->x < bb->min.x)  ||  (v->x >bb->max.x)  ||
         (v->y < bb->min.y)  ||  (v->y >bb->max.y)  ||
         (v->z < bb->min.z)  ||  (v->z >bb->max.z))
        return(FALSE);
    return(TRUE);
}
int
boundBoxOverlap(BoundBox *b1, BoundBox *b2)
{
    if ((b1->status == bbNotSet)  ||  (b2->status == bbNotSet))
        return(FALSE);
    /*  If there is no overlap in at least one axis, then you know they
        can't intersect */
    if   ((b1->min.x > b2->max.x)  ||
          (b1->min.y > b2->max.y)  ||
          (b1->min.z > b2->max.z)  ||
          (b2->min.x > b1->max.x)  ||
          (b2->min.y > b1->max.y)  ||
          (b2->min.z > b1->max.z))
        return(FALSE);
    return(TRUE);
}
```

-continued

```
void
boundBoxPrint (BoundBox *bb)
{
    printf("BoundBox\n\tMin: (%g, %g, %g)\n\tMax: (%g, %g, %g)\n",
        bb->min.x, bb->min.y, bb->min.z,
        bb->max.x, bb->max.y, bb->max.z);
    return;
}
Vertex3 poly1[3] = {
    {0.0, 0.0, 0.0},
    {1.0, 0.0, 0.1},
    {0.0, 1.0, 0.2}
};
Vertex3 poly2[3] = {
    {0.4, 0.4, 0.1},
    {1.0, 1.0, 0.1},
    {0.4, 1.5, 0.0}
};
main()
{
    int i;
    BoundBox p1bb, p2bb;
    boundBoxReset(&p1bb);
    boundBoxReset(&p2bb);
    for(i=0;i<3;i++) {
        boundBoxGrowVertex3(&p1bb, &(poly1 [i]));
        boundBoxGrowVertex3(&p2bb, &(poly2 [i]));
    }
    printf("Boundbox 1:\n");
    boundBoxprint(&p1bb);
    printf("Boundbox 2:\n");
    boundBoxPrint(&p2bb);
    printf("Bounding boxes %s.\n",
        (boundBoxOverlap(&p1bb, &p2bb)==TRUE)?"overlap":"don't
    overlap");
}
```

Having above indicated a preferred embodiment of the present invention, it will occur to those skilled in the art that modifications and alternatives can be practiced within the spirit of the invention. It is accordingly intended to define the scope of the invention only as indicated in the following claims.

We claim:

1. A system for generating a virtual environment in which graphical objects are to be depicted within required accuracy regardless of location within said virtual environment and so as to avoid the use of a global coordinate system for said virtual environment, comprising:

means for generating a number of locales each having a predetermined boundary and origin, each of said locales defining a subdivision of said virtual environment;

means for locating a graphical object in a locale based on positions measured from the origin thereof, such that location and movement of a graphical object can be made with the required precision due to the utilization of a local origin within a locale as opposed to using a single point within said virtual environment, whereby the problems of providing a global coordinate system and positional inaccuracies associated with graphical objects located at large distances from a single origin are eliminated; and a network having multiple work stations to accommodate multiple designers for said virtual environment, each designer responsible for a different locale, and means for ascertaining when two of said locales overlap and for automatically indicating to said designers to the existence of overlapping regions of said locales, whereby multiple designers can work independently to create different locales within said virtual environment while at the same time being given means for resolving conflicts due to overlap of locales.

2. The system of claim 1, and further including means responsive to the existence of overlapping locales for automatically altering overlapping locales by creating differently configured non-overlapping locales.

3. The system of claim 1, and further including means responsive to the existence of overlapping locales for assigning control of the design of an overlapping region of overlapping locales to one of said designers.

4. The system of claim 1, and further including means for controlling movement of a graphical object across boundaries between adjacent locales including means for specifying the distance between the origins of said adjacent locales, means for specifying the relative orientation between said adjacent locales and means for controlling said movement referenced to said distance and said orientation.

5. The system of claim 4, wherein said movement controlling means includes means for automatically changing the values representing the position of a graphical object in the adjacent locale from which said graphical object is moving to values representing the position of said graphical object in the adjacent locale to which said graphical object is moved, said means including a transformation matrix based on the distance between said adjacent locales and the relative orientation thereof.

6. The system of claim 5 wherein said transformation matrix is a general transformation matrix supporting reflection,, duplication, and scaling of locales.

7. The system of claim 1, wherein said virtual environment contains a first locale and a second locale distant from said first locale, said system further including means controlled by one of said designers for ignoring data related to said second locale, thereby to minimize processing and data handling requirements of said network.

8. A system for generating a virtual environment in which graphical objects are to be depicted within required accuracy regardless of location within said virtual environment and so as to avoid the use of a global coordinate system for said virtual environment, comprising:

means for generating a number of locales each having a predetermined boundary and origin, each of said locales defining a subdivision of said virtual environment:

means for locating a graphical object in a locale based on positions measured from the origin thereof, such that location and movement of a graphical object can be made with the required precision due to the utilization of a local origin within a locale as opposed to using a single point within said virtual environment, said locale being neighbors of other locales, each of said neighboring locales having a set of transformations that relate its coordinate system to that of neighboring locales, whereby the problems of providing a global coordinate system and positional inaccuracies associated with graphical objects located at large distances from a single origin are eliminated; and a network having multiple work stations to accommodate multiple designers for said virtual environment, each designer responsible for a different locale, and means for ascertaining when two of said locales overlap and for automatically indicating to said designers to the existence of overlapping regions of said locales, whereby multiple designers can work independently to create different locales within said virtual environment while at the same time being given means for resolving conflicts due to overlap of locales.

9. The system of claim 8, and further including means responsive to the existence of overlapping locales for automatically altering overlapping locales by creating differently configured non-overlapping locales.

10. The system of claim 8, and further including means responsive to the existence of overlapping locales for assigning control of the design of an overlapping region of overlapping locales to one of said designers.

11. The system of claim 8, and further including means for controlling movement of a graphical object across boundaries between adjacent locales including means for specifying the distance between the origins of said adjacent locales, means for specifying the relative orientation between said adjacent locales and means for controlling said movement referenced to said distance and said orientation.

12. The system of claim 11, wherein said movement controlling means includes means for automatically changing the values representing the position of a graphical object in the adjacent locale from which said graphical object is moving to values representing the position of said graphical object in the adjacent locale to which said graphical object is moved, said means including a transformation matrix based on the distance between said adjacent locales and the relative orientation thereof.

13. The system of claim 12 wherein said transformation matrix is a general transformation matrix supporting reflection, duplication, and scaling of locales.

14. The system of claim 8, wherein said virtual environment contains a first locale and a second locale distant from said first locale, said system further including means controlled by one of said designers for ignoring data related to said second locale, thereby to minimize processing and data handling requirements of said network.

* * * * *